(12) United States Patent
Bandekar et al.

(10) Patent No.: US 7,302,507 B2
(45) Date of Patent: Nov. 27, 2007

(54) REESTABLISHING CONNECTIONS WHEN A BLOCK/DEVICE AT ONE END IS RE-INITIALIZED

(75) Inventors: Raj L. Bandekar, Warminster, PA (US); Hsi Shen Chai, Blue Bell, PA (US)

(73) Assignee: Honeywell International Inc., Morristown, NJ (US)

( * ) Notice: Subject to any disclaimer, the term of this patent is extended or adjusted under 35 U.S.C. 154(b) by 611 days.

(21) Appl. No.: 10/675,276

(22) Filed: Sep. 29, 2003

(65) Prior Publication Data

US 2005/0071530 A1    Mar. 31, 2005

(51) Int. Cl.
*G06F 13/42* (2006.01)
*G06F 13/14* (2006.01)
*G06F 15/16* (2006.01)

(52) U.S. Cl. .................. 710/105; 710/305; 709/203
(58) Field of Classification Search ................ 710/105, 710/305; 709/203
See application file for complete search history.

(56) References Cited

U.S. PATENT DOCUMENTS

| | | | |
|---|---|---|---|
| 5,978,850 A * | 11/1999 | Ramachandran et al. ... | 709/228 |
| 6,047,222 A | 4/2000 | Burns et al. | |
| 6,085,227 A * | 7/2000 | Edlund et al. ............... | 709/203 |
| 6,098,116 A | 8/2000 | Nixon et al. | |
| 6,412,025 B1 | 6/2002 | Cheston et al. | |
| 6,449,624 B1 | 9/2002 | Hammack et al. | |
| 6,574,239 B1 * | 6/2003 | Dowling et al. ............. | 370/469 |
| 6,618,745 B2 * | 9/2003 | Christensen et al. ........ | 709/201 |
| 2002/0078208 A1 * | 6/2002 | Crump et al. ................ | 709/227 |
| 2002/0083364 A1 * | 6/2002 | Christensen et al. .......... | 714/13 |
| 2003/0016809 A1 | 1/2003 | Xie | |
| 2003/0043435 A1 | 3/2003 | Oettinger et al. | |
| 2004/0153594 A1 * | 8/2004 | Rotvold et al. ............. | 710/305 |

* cited by examiner

*Primary Examiner*—Mark H. Rinehart
*Assistant Examiner*—Christopher Daley
(74) *Attorney, Agent, or Firm*—Naren Thappeta (57) ABSTRACT

Reestablishing connections when a block/device at one end is re-initialized. The data elements necessary for reestablishing a connection at both ends may be stored in a third device. When a block/device at one end is re-initialized, additional data elements necessary for reestablishing connection may be received from the re-initialized block, and all the data elements may be used to re-establish the connection. In an embodiment implemented in the context of a control system, a supervisory control station stores image of the various intermediate objects used in both end devices (at which ends of a connection terminate), receives parameters which identify changes when an end device is re-initialized, and makes changes to the stored intermediate objects. The changed objects are downloaded to the respective end devices to reestablish the connection.

27 Claims, 6 Drawing Sheets

FIG. 6

REESTABLISHING CONNECTIONS WHEN A BLOCK/DEVICE AT ONE END IS RE-INITIALIZED

BACKGROUND OF THE INVENTION

1. Field of the Invention

The present invention generally relates to communication protocols, and more specifically to a method and apparatus for reestablishing a connection when a block/device at one end is re-initialized.

2. Related Art

Connections are generally provided to enable communication between end devices. As is well known, connections can be of unicast type (one end device at either end of the connection), multicast type (one end device sending data to specific set of end devices) or broadcast type (one end device to all end devices). Once a connection is established, a sender device (one of the end devices) may send data to the receiving device(s) to enable various applications.

An end device (or a block with the end device) may need to be re-initialized after being set up and used by an application. For example, the end device may become non-operational after accurate operation for a while, and may thus need to be replaced. All the components (including software) within such a replaced end-device may be re-initialized.

There is often a need to reestablish a connection that existed prior to re-initialization. For example, a receiver device in a control system may be designed to receive various inputs from different sender devices and perform various control operations. Even if one of the sender devices becomes non-operational temporarily, the receiver device may continue to operate (but possibly with degraded performance). When the operation of the non-operational device is restored (by replacement, reboot, etc.), it may be desirable to reestablish the prior connection such that the receiving device can then continue operations based on any inputs that may be generated by the restored device.

SUMMARY

An aspect of the present invention provides a connection between a first device and a second device. In an embodiment, a connection is established between the first device and the second device, and data elements necessary for re-establishing the connection are stored in a third device. When the second device is reinitialized, a second data element is received from the second device. The connection is reestablished by modifying parameter value(s) in each of the first device and the second device based on the stored data elements and the received data element.

In one implementation, the second device contains multiple objects providing the connection, and the second data element comprises an index indicating a memory location where one of the plurality of objects is stored. The objects in turn may contain a link object and a virtual communication relationship (VCR) object, with the link object providing a link between the VCR object and a location storing an application data exchanged between the first device and the second device, and the VCR object providing a link to another VCR object in the first device. Such a implementation may be used in a control system, with the third device being contained in a supervisory control station which otherwise is used to manage the configuration and initialization of the devices.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview

According to an aspect of the present invention, the data values necessary to reestablish a connection are stored in a third device, and the stored data values are used to reestablish the connection if one of the ends is re-initialized. Any user applications using the application data transferred on such a connection may continue using the transferred application data.

In an embodiment implemented in the context of a control system (used in environments such as manufacturing plants), a connection between a publisher block (which generates the application data) and a subscriber block (which uses the packets) is reestablished by storing images of various communication objects in a supervisory control station.

The objects at each end may contain a link object and a VCR (virtual communication relationship) object, with the VCR object providing the necessary information to connect with a counterpart VCR in another end device. In the case of a publisher block, the link object provides the information identifying the memory location at which the application data (generated by the publisher block) is available and the VCR on which the application data is to be transmitted.

In the case of a subscriber block, the link object identifies the VCR on which application data is to be received, and the memory location at which the application data (received from publisher block) may be stored such that the subscriber block can process the application data further.

In an example embodiment described below, a subscriber block is designed to operate based on inputs (of application data) received from multiple end devices operating as publishers. The subscriber block may continue to operate (possibly with a degraded quality in performance) even if one of the publishers ceases providing the inputs.

Thus, if an end device containing a publisher block is to become non-operational (or otherwise has to be replaced or re-initialized), the end device may be replaced. A supervisory control station may control instantiation of the publisher block and may receive an index identifying the memory location at which the reinitialized publisher block is located.

The supervisory control station may use the index to modify various connection objects in the two end devices (publisher and subscriber) to re-establish the connection. The publisher may re-start sending data values on the re-established connection, and the subscriber may again use the received data values.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1:
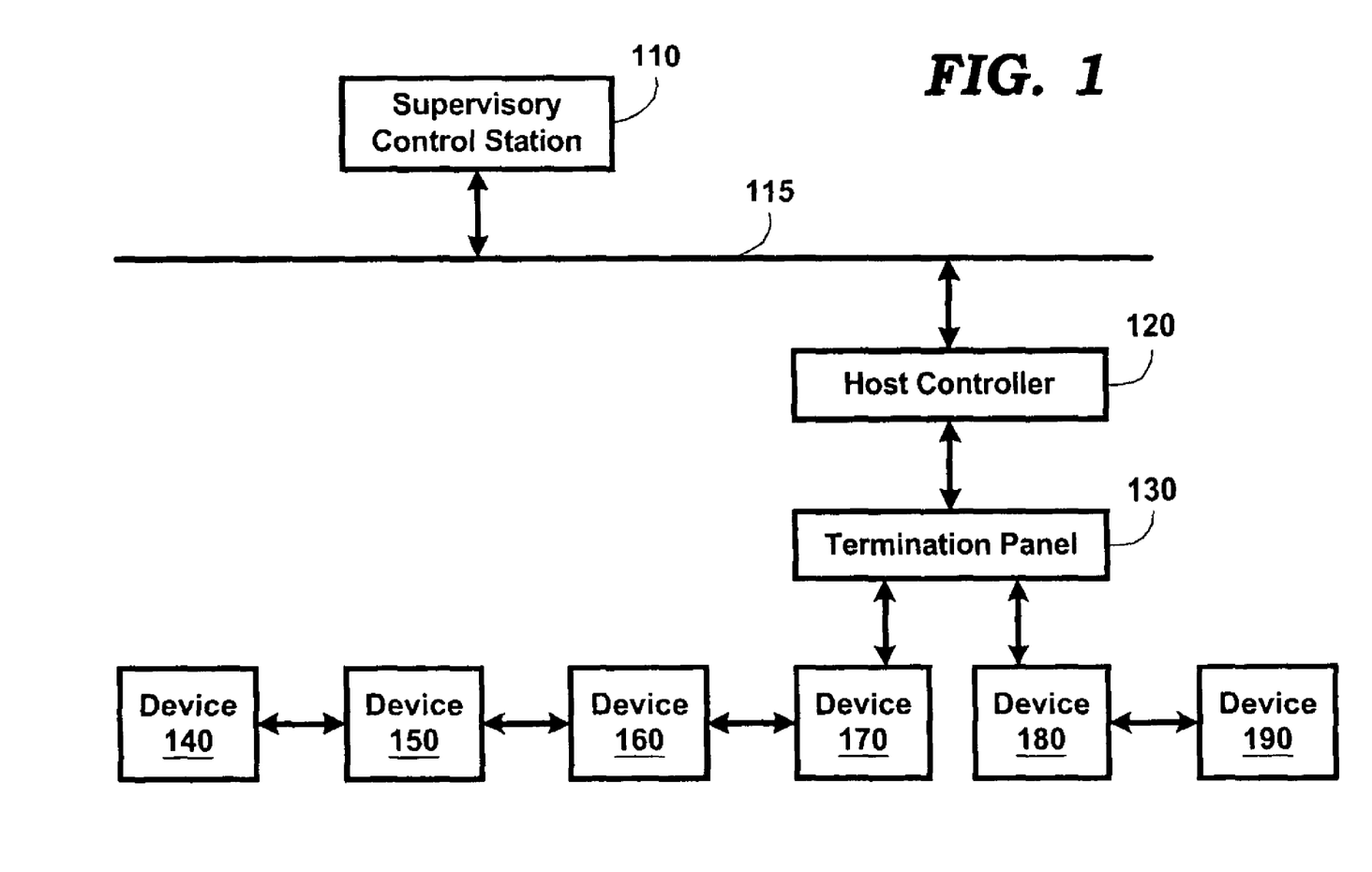
FIG. 1 is a block diagram illustrating an example environment in which the present invention can be implemented.

FIG. 1 is a block diagram illustrating an example environment in which the present invention can be implemented. The environment is shown containing supervisory control station 110, host controller 120, termination panel 130 and devices 140 through 190. Each block is described below in detail.

It may be appreciated that the environment is shown containing only a few devices for illustration. However, a typical environment may contain many devices and such environments are also contemplated to be within the scope and spirit of the present invention. In one embodiment, supervisory control station 110, host controller 120, and termination panel 130 are implemented using Experion PKS Station (Model number—MZ-NTPC03), Control Builder (Model number—TC-SWCB11), Fieldbus Interface Module (Model number—TC-FFIF01) and Fieldbus RTP (Model number—TC-FFRU01), available from Honeywell International, the assignee of the subject application.

Host controller 120 is shown connected to termination panel 130 on one side and supervisory control station 110 (via path 115) on the other side. Host controller 120 may communicate with supervisory control station 110 using Control net protocol, described in further detail in a document entitled, "Control Net Specification Ver 2.0", Dated Mar. 31, 1998, available from Control Net International, PMB 315, State Road 7 #F6, Boca Raton, Fla. USA 33498-6797 (http://www.controlnet.org).

Host controller 120 also communicates with devices 140 through 190 via termination panel 130 using field bus protocol. Field bus protocol is described in further detail in a documents entitled, "Foundation(TM) Fieldbus Technical Specification(s), FF 801 ver 1.5, FF 822 ver 1.5, FF 106 1.6, FF 890 ver 1.5 FF 891 ver 1.5" and "International Electrotechnical Commission IEC 61158 Part 4 Data Link Layer Specification" available from Foundation Fieldbus, 9005 Mountain Ridge Drive, Bowie Bldg—Suite 190, Austin, Tex. 78759-5316,512.794.8890.

Devices 140 through 190 represent end devices between which connections can be established. The established connections can be used to support various applications. As described below, an aspect of the present invention enables the connection to be re-established if one of the end devices is to be replaced or otherwise initialized.

Supervisory control station 110 may control the configuration of the devices, and facilitate establishment of connections between the devices. In addition, supervisory control station 110 facilitates re-establishment of connections (between devices) as described in sections below. It may be helpful to understand an example scenario in which such re-establishment may be desirable. Accordingly such example scenario is described below in further detail.

3. Example Scenario Where Re-establishment of Connection is Desirable

Figure 2:
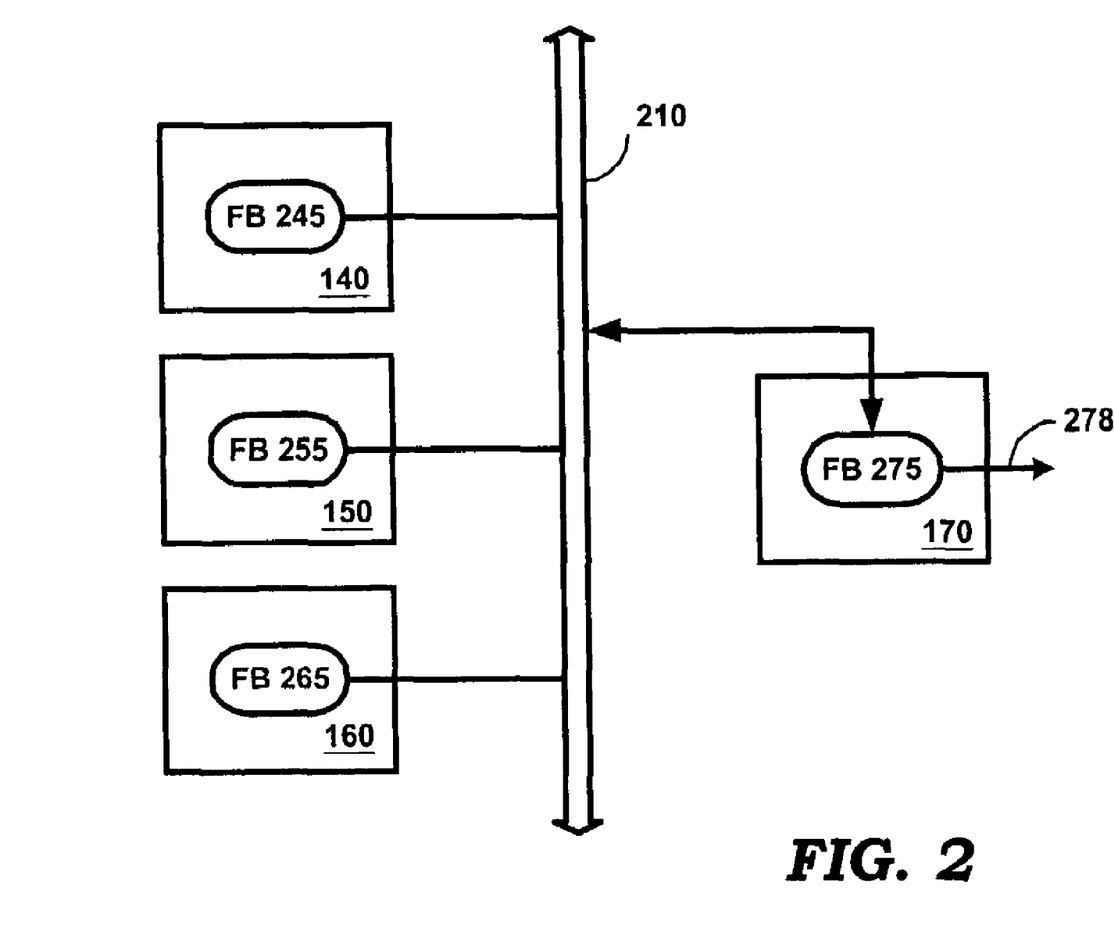
FIG. 2 is a block diagram illustrating an example scenario in which reestablishing connection may be useful.

FIG. 2 is a block diagram illustrating an example scenario in which re-establishment of a connection may be desirable. The block diagram is shown containing devices 140, 150, 160, and 170 respectively containing function blocks (FB) 245, 255, 265 and 275. The operation of the function blocks is described below in further detail.

In general, a function block refers to a block (implemented in a combination of one or more of hardware, software and firmware) which performs a desired operation on an input (analog or digital) to generate an output. For illustration, it is assumed that each of the function blocks 245, 255 and 265 generates respective output values (application data), which need to be provided as inputs to function block 275.

Function block 275 is further assumed to generate as an output an average value of the available inputs. Assuming that function blocks 245, 255, and 265 are operational, the output value of function block 275 may equal the average of three inputs (provided by the three function blocks).

When one. device (e.g., 150) becomes non-operational, the output of function block 275 may equal the average of the remaining two inputs. However, if the non-operational device becomes operational again, function block 275 may compute output 278 as equaling the average of the three inputs (received from function blocks 245, 255 and 265). Accordingly, it may be desirable to re-establish connection between function blocks 255 and 275 once device 150 becomes operational. The manner in which the connections may be re-established is described below in further detail.

4. Method

Figure 3:
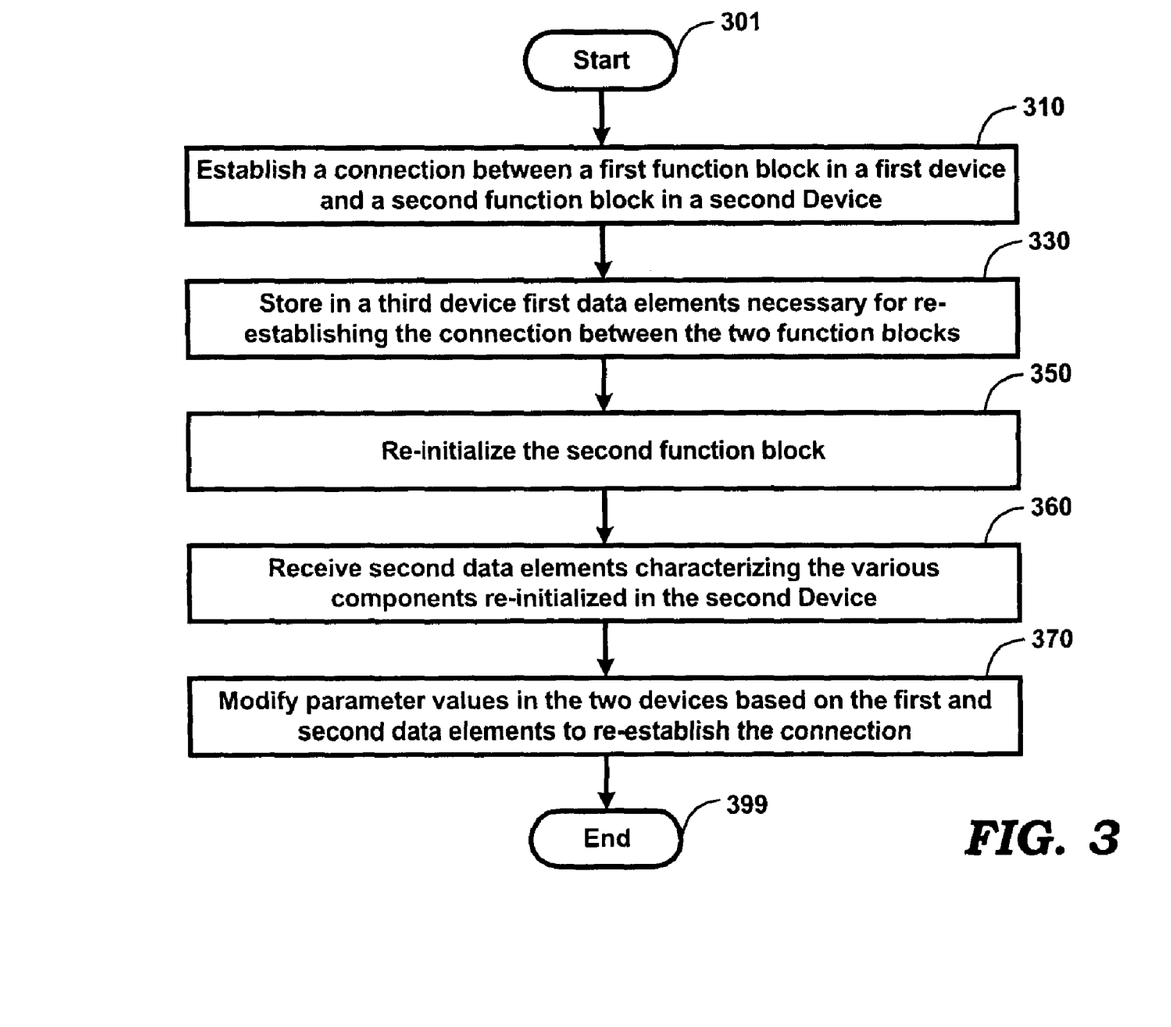
FIG. 3 is a flow-chart illustrating the manner in which connections may be reestablished according to an aspect of present invention.

FIG. 3 is a flow-chart illustrating the manner in which a connection may be re-established according to an aspect of the present invention. The method is continued with reference to FIGS. 1 and 2, and assuming that device 150 is to be replaced for illustration only. However, the method is also potentially applicable in other environments and other types of scenarios as well. The method begins in step 301, in which control immediately passes to step 310.

In step 310, a connection is established between a first function block (275) in a first device (170) and a second function block (255) in a second device (150). The establishment of connection generally depends on the specific underlying protocol, and may be established in a known way.

In step 330, first data elements necessary for re-establishing the connection between the two function blocks are stored in a third device. Storing the data elements in a third device enables the connection at either end to be re-established. The specific data elements stored include the various parameters which are used to setup the internal data structures (communication objects in the embodiments below) in the end devices.

In step 350, second function block is re-initialized. For example, assuming that device 150 is non-operational and needs to be replaced, a new unit may be installed for device 150. In step 360, supervisory control station 110 receives second data elements characterizing the various components re-initialized in second device (150).

In step 370, parameter values in the two devices are modified using the first and second data elements to reestablish the connection. Once the values in both the devices are modified, the connection between two devices may be reestablished. The method ends in step 399.

Thus, when a device at one end of a connection is restored, the connection may be reestablished according to several aspects of present invention. However, the steps of FIG. 2 generally depend on the specific data structures used internal to the devices for a desired operation of the connection. Accordingly, the description is continued with respect to example data structures which support a connection.

5. Example Data Structures Supporting a Connection

Figure 4:
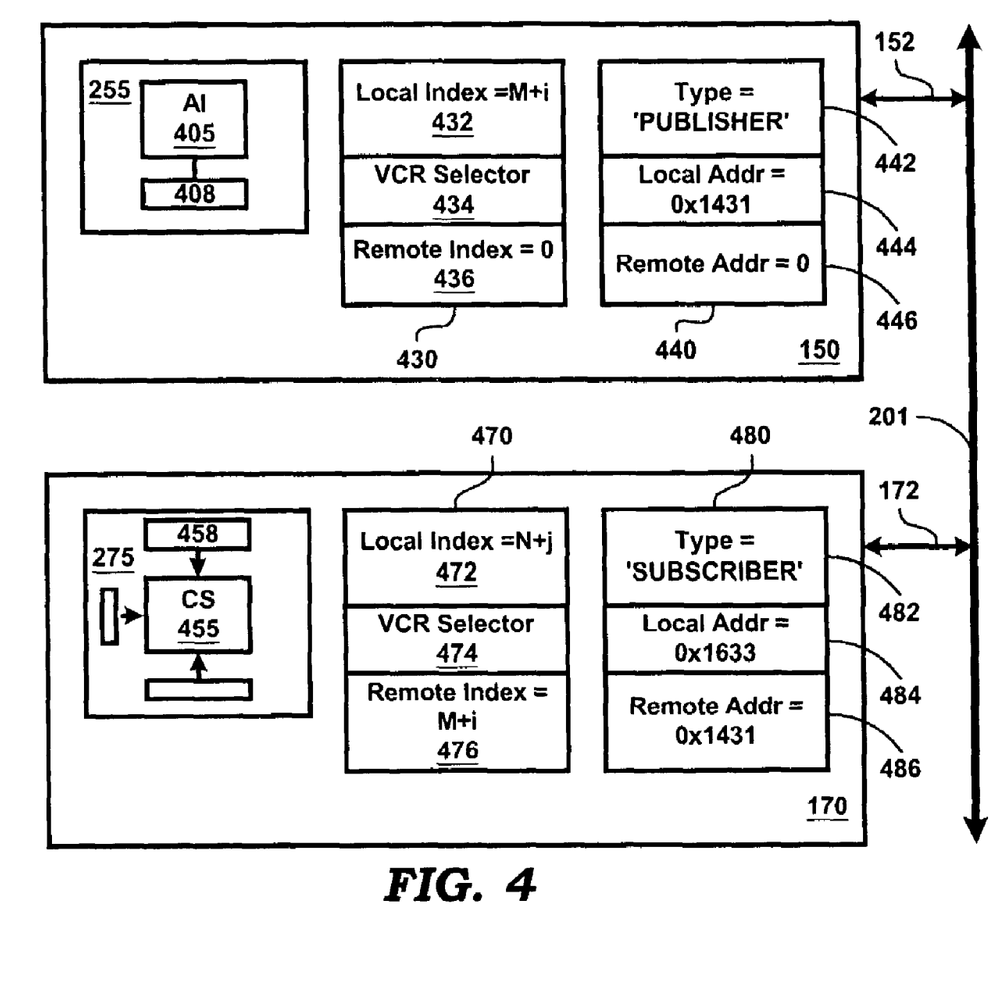
FIG. 4 is a block diagram illustrating example objects (data elements) that are setup for establishing connection between two devices in an example embodiment.

FIG. 4 is a block diagram illustrating the various objects (containing data structures) that may be used to enable communication between function blocks 255 and 275 (in devices 150 and 170 respectively) described above. Device 150 is shown containing function block (FB) 255, link object 430 and virtual communication relationship (VCR) 440. Similarly, device 170 is shown containing function block (FB) 275, link object 470 and VCR 480. While each device is shown containing representative objects only as needed for describing various aspects of the present invention, it should be understood that typical environments contain several more objects (of different types). Each object as relevant to the communication is described below in further detail.

Object dictionary contains a memory map related to various objects in device 150. The memory map may specify an offset at which each of the objects is located. The location of each object (particularly the objects that are instantiated dynamically as and when desired) may change when device 150 is re-initialized (replaced or set to factory defaults), but the specific location may be accurately specified in object dictionary. An aspect of the present invention enables connections to be re-established even when the location of instantiable objects changes upon re-initialization of device 150.

Function block 255 is shown containing algorithm block 405 which generates output value(s) 408. In general, algorithm block 405 receives a measurement value (e.g., representing an electric voltage having strength proportionate to a measured variable (e.g., pressure)), and generates an output value (e.g., a digital value) by examining/processing the measured value. The output values thus generated are to be provided to function block 275 in device 170. The manner in which the other objects ("communication objects") may allow the output values to be provided is described in further detail below.

Link object 430 is shown containing three fields—local index 432, VCR selector 434, and remote index 436. Local index 432 specifies the memory location at which output value 408 would be available. Local index 432 is shown equal to 'M+i', wherein 'M' indicates the index of FB 255 and 'i' indicates an offset value. Thus, output value 408 would be available at a memory location corresponding to M+i address as each instance of the value is generated.

VCR selector 434 may uniquely identify the specific VCR (here, VCR 440 having selector of 31, as described below further) using which output value 408 is to be transmitted. Remote index field 436 indicates the index of a parameter in the remote device from which the corresponding function block may accept inputs. Remote index field 436 is shown set to '0' to indicate that FB 255 is publishing (which can be received by several receiving function blocks) output value 408.

VCR 440 is shown containing three fields-type 442, local Address 444, and remote address 446. The type field indicates the specific purpose (whether publisher, subscriber, etc.) for which the VCR may be used. Type field 442 is shown set to 'publisher' indicating that data is to be transmitted using VCR 440.

Each of local address and remote address is shown containing four digits (hexadecimal format). The first two digits indicate an address uniquely identifying the specific device, and the last two digits identify the VCR selector. Assuming that devices 150 and 170 are respectively assigned addresses of 14 and 16, and that VCRs 440 and 480 are respectively assigned a selector value of 31 and 33, local address field 444 is shown set to 0×1431. Local address field 484 equals '0×1633', whereas remote address field 486 equals '0×1431'.

Thus, each data instance (value) generated by algorithm block 405 is processed by link object 430 as local index 432 contains the address of output 408. Link object 430 further provides link to VCR 440 as VCR selector 434 contains an index identifying VCR 440 in VCR list. VCR 440 publishes data instance (output value 408). The data packet in addition to output value 408, also contains '0×1431' (address of device 150) present in local address field of VCR 440. VCR 480 (VCR of a subscriber, device 170) receives data packet based on the match between the value in remote address field ('0×1431') and the value of local address (of publisher, device 150) contained in the data packet.

The below description (of objects in device 170) further illustrates the manner in which the data instances are delivered to function block 275. For conciseness, the objects of device 170 are described in relation to the corresponding objects of device 150. Type field 482 (in VCR object 480) containing a value of 'Subscriber' indicates that VCR 480 is being used to receive data. The value in remote address field 486 matches the values in local address field 444, and is used to receive data instances/values as noted above.

Link object 470 connects VCR 480 to function block 275, and is shown containing three fields-local index 472, VCR selector 474, remote index 476. VCR selector field 474 (in link object 470) may contain an index to indicate that link object 470 connects VCR object 480. Local index field 472 is set to (N+j), wherein 'N' represents an index to FB 275 and 'j' indicates the offset value from the index. Thus, (N+j) represents an address of input value 458, from which control selector algorithm 455 receives the input value instances. Remote index field 476 is shown containing a value of (M+i), matching the value in local index field 432.

Thus, from the above description, it may be appreciated that the data instances generated by algorithm block 405 are delivered to control selector algorithm 455. Similarly, additional communication objects (link objects and VCRs) may be established if communication is desired from device 170 to device 150.

Accordingly, once the various fields in the communication objects are setup, connection may be setup between function blocks 255 and 275. However, if one of the function blocks is to be re-initialized, various challenges may be presented in re-establishing the connection. An example problem in re-establishing communication if device 150 (or function block 255) is re-initialized is described below.

6. Problem

For illustration, it is assumed that device 150 becomes non-operational and another unit is used as a replacement. A new function block (which functions similar to FB 255) may be instantiated. The instantiated function block may have an index of 'P' (different from 'M').

As a result of the change in local index (from 'M+i' to 'P+i'), the connection between replacement device and device 170 may not be re-established. An aspect of the present invention enables the connection to be seamlessly re-established, and for device 170 to continue to receive new data instances generated by the replaced device 150, as described below in further detail.

7. Modifying Data Elements to Re-establish Connection

Figure 5:
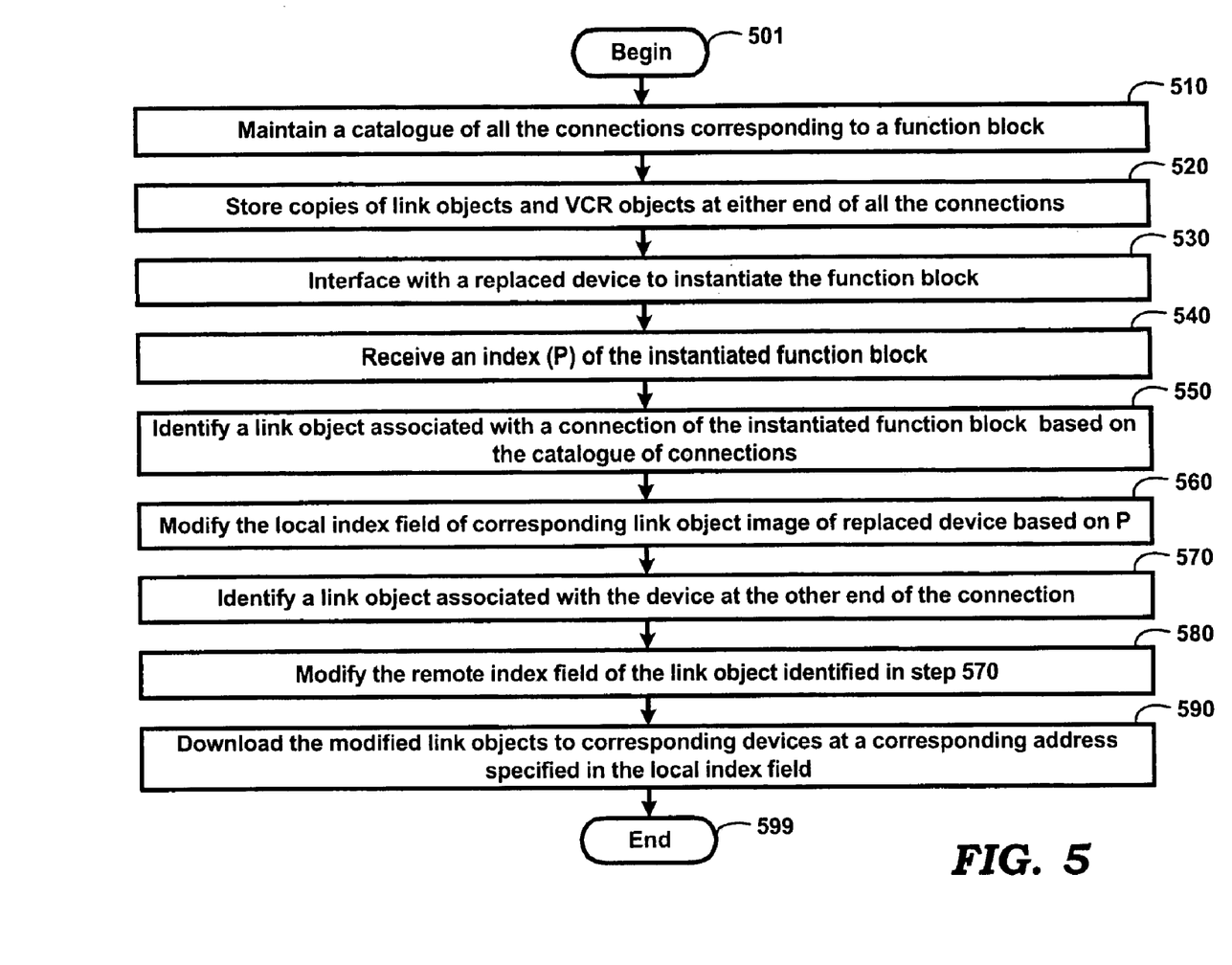
FIG. 5 is a flow-chart illustrating the manner in which a supervisory control station may reestablish connection between two devices of a control system according to an aspect of present invention.

FIG. 5 is a flow-chart illustrating the manner in which supervisory control station 110 may operate to re-establish connections according to an aspect of present invention. The method begins in step 501 in which the control is immediately transferred to step 510.

In step 510, supervisory control station 110 maintains a catalogue of all the connections from/to function block 255. Each entry in the catalogue may be used to identify a link object corresponding to an output value (e.g., 408) associated with function block 275, in addition to link objects in devices at the other end of the connection.

In step 520, supervisory control station 110 may further store (e.g., in a local database) copies of link objects and VCR objects at either end of all connections. In an embodiment, supervisory control station 110 controls initialization of the devices and instantiation of various function blocks within the devices, and data representing the objects may be generated (within supervisory control station 110) or received (from device) as a part of such initialization/instantiation.

In step 530, supervisory control station 110 may interface with a replaced device (150 of FIG. 1) to instantiate function block 255. In general, a pre-specified protocol needs to be implemented in both supervisory control station 110 and device 150 to enable such instantiation, and several such protocols will be apparent to one skilled in the relevant arts. In an embodiment, device 150 generates an index to the function block, and store the generated index in a corresponding object dictionary. For clarity, the index is assumed to equal 'P' (index of function block 255 in device 150 was equal to 'M').

In step 540, supervisory control station 110 receives index 'P' of the instantiated function block. In step 550, supervisory control station 110 identifies a link object associated with a connection to/from function block 255 based on the catalogue noted in step 510. Any database or memory used for storing the catalogue may be accessed for such an identification.

In step 560, supervisory control station 110 modifies the local index field of corresponding link object image based on the received index 'P'. In the example illustrated above with reference to FIG. 4, the local index field in the copy of link object 430 may be modified to contain 'P+i' (in place of 'M+i').

In step 570, supervisory control station 110 identifies a link object associated with the device (170, in the illustrative example) at the other end of connection. In an embodiment, the catalogue is designed to identify the copy of the link object (470, in the example). Alternatively, the catalogue may be examined to determine the copy of link object 470 maintained within supervisory control station 110.

In step 580, supervisory control station 110 modifies the remote index field of link object identified in step 570. In the example of FIG. 4, remote index field in the copy of link object 470 may be modified to contain 'P+i' (in place of 'M+i'). In step 590, supervisory control station 110 loads the modified link objects to corresponding devices at a corresponding address (P and N) specified in the local index field.

Once the loading of the objects is complete, the connection may be re-established between the instantiated function block 255 and function block 275 assuming that VCR 440 would be instantiated in the same way as before replacement. In general, modification approaches need to be implemented to modify any connection objects which may be instantiated with different values. The method ends in step 599.

Thus, the affected portions of the connection specified by the high level functionality may be traced and updated with modified data elements without disrupting the entire high level functionality as described above. Aspects of the present invention enables replacement of one device with other device from a different vendor as well. The above algorithm may need to be implemented in other type of connections or connection ends as well. The description is continued with reference to other type of connections.

8. Other Types of Connections or Connection Ends

Other types (i.e., other than a publisher sending data to a single subscriber) of connections may be used to enable data transfers between field bus devices. Some example connection types (and also end types), and the manner in which supervisory control station 110 may be implemented to support re-establishing the corresponding connections is described below in further detail. For conciseness, only differences in relation to the above described example (in which the publisher of data to a single subscriber was assumed to be replaced) are described below.

It is now assumed that subscriber device 170 (instead of publisher 150) is replaced (or otherwise re-initialized). Thus, the end of the connection is of a different type (i.e., subscriber type), which may be determined by examining the information maintained in the catalogue. For subscriber type connections, only local index field 472 in the local link object may need to be modified. For example, if function block 275 in device 170 is re-initialized, then index 'N' in local index field 'N+j' is to be replaced with index of the instantiated function block 275.

It is now assumed that the replaced device operates as a publisher, but there are multiple subscribers. In such a scenario, the catalogue may be designed to identify all the devices (and the objects within) which operate as subscribers, and the link object related to each connection (terminating at a corresponding subscriber device) may be modified as described above.

It may be further appreciated that no changes to VCR objects are described as being necessary in the example above since the example devices are designed to re-initialize with the same values in the various VCR fields. However, in alternative embodiments in which contents of VCR objects change, changes may be effected in those objects as well.

Similarly, the approaches described above may be extended to client-server architectures, with the server and client respectively operating similar to the publisher and subscriber in the above examples. The description is now continued with reference to an embodiment of supervisory control station 110 substantially in the form of software.

9. Supervisory Control Station

Figure 6:
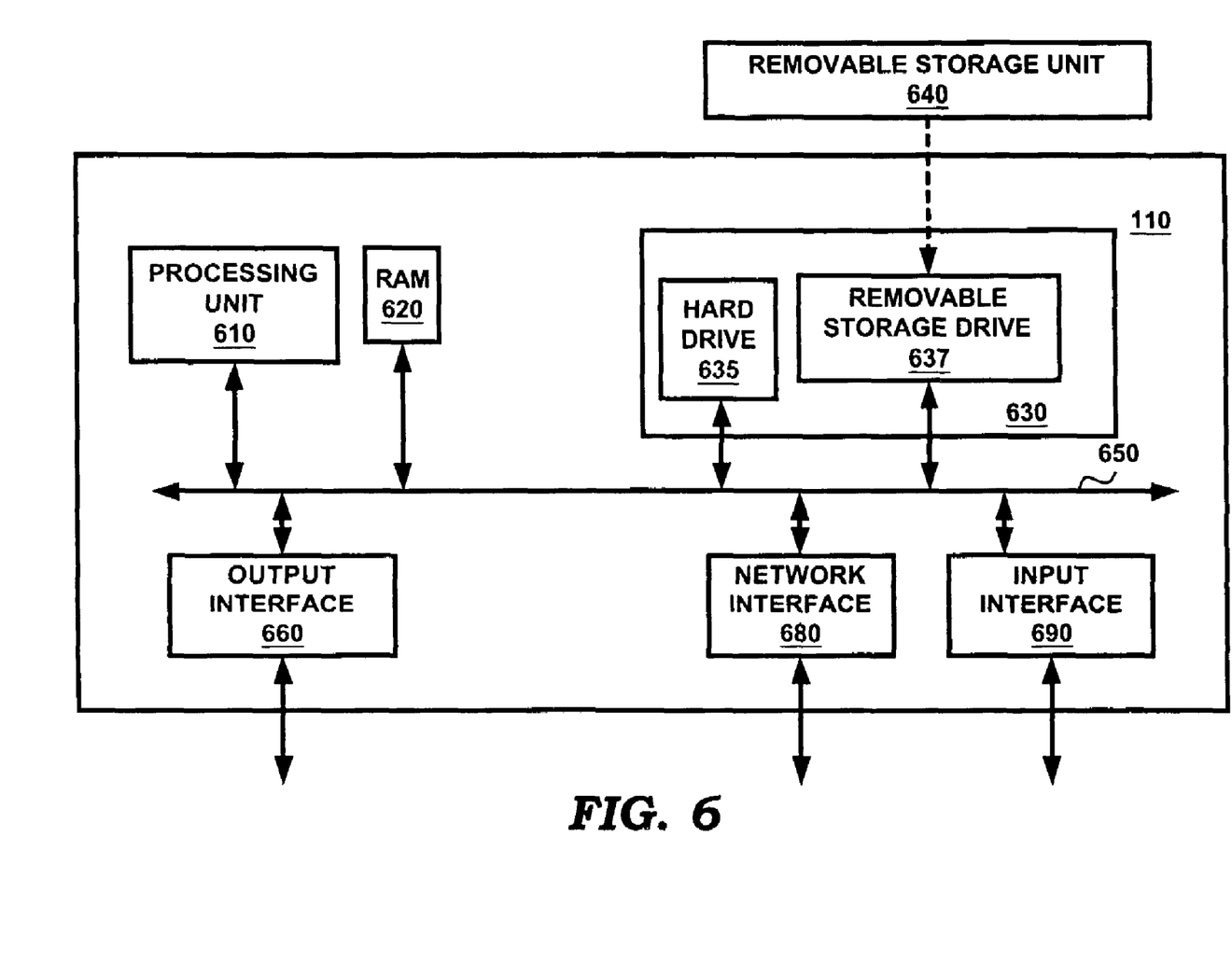
FIG. 6 is a block diagram illustrating the details of supervisory control station in one embodiment.

FIG. 6 is a block diagram illustrating the details of supervisory control station 110 in one embodiment. Supervisory control station 110 is shown containing processing unit 610, random access memory (RAM) 620, storage 630, output interface 660, network interface 680 and input interface 690. Each block is described in further detail below.

Output interface 660 provides output signals (e.g., display signals to a display unit, not shown) which can form the basis for a suitable interface for an user to provide high level functionality based on which various functional objects may be configured. Input interface 690 (e.g., interface with a key-board and/or mouse, not shown) enables a user to provide any necessary inputs (e.g., while configuring field bus devices, instantiating function blocks, etc) to supervisory control station 110.

Network interface 680 may enable sending/receiving of various packets for various management tasks (e.g., configuration and instantiation) using Control Net protocol noted above. Network interface 680, output interface 660 and input interface 690 may be implemented in a known way.

RAM 620 receives instructions and data on path 650 from storage 630, and provides the instructions to processing unit 610 for execution. Secondary memory 630 may contain units such as hard drive 635 and removable storage drive 637. Secondary storage 630 (supporting the implementation of a database) may store the copies of communication object corresponding to each function block, catalogue of all connections to/from a function block, which enables supervisory control station 110 to provide several features in accordance with the present invention.

While secondary memory 630 is shown contained within supervisory control station 110, an alternative embodiment may be implemented with the secondary memory implemented external to supervisory control station 110, and the corresponding data may be accessed using network interface 680.

Some or all of the data and instructions may be provided on removable storage unit 640 (or from a network using protocols such as TCP/IP, control net protocol, and Field bus protocol), and the data and instructions may be read and provided by removable storage drive 637 to processing unit 610. Floppy drive, magnetic tape drive, CD-ROM drive, DVD Drive, Flash memory, removable memory chip (PCM-CIA Card, EPROM) are examples of such removable storage drive 637.

Processing unit 610 may contain one or more processors. Some of the processors can be general purpose processors which execute instructions provided from RAM 620. Some can be special purpose processors adapted for specific tasks (e.g., for database management). The special purpose processors may also be provided instructions from RAM 620.

In general, processing unit 610 reads sequences of instructions from various types of memory medium (including RAM 620, storage 630 and removable storage unit 640), and executes the instructions to provide various features of the present invention. Supervisory control station 110 needs to be implemented with the corresponding supporting software instructions, and such implementations may be implemented in a known way.

10. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method of providing a connection between a first device and a second device contained in a process automation system, said process automation system also containing a host controller designed to control operation of said first device and said second device, wherein each of said first device and said second device is implemented as a separate physical unit from said host controller, said method comprising:

establishing said connection between said first device and said second device a first field in said first device and a second field in said second device being required to have a same value for communication on said connection between said first device and said second device;

storing in a third device data identifying said first field in said first device and said second field in said device;

receiving data indicating that said second field has changed to a new value-when said second device is reinitialized;

examining said data in said third device to determine that the value in at least one of said first field and said second field is to be changed for communication to continue on said connection between said first device and said second device after said initialization; and reestablishing said connection between said first device and said second device after said reinitialization by changing the value in at least one of said first field and said second field to ensure the values in said first field and said second field are equal, wherein said second device contains a plurality of objects providing said connection, wherein said new value comprises an index indicating a memory location where one of said plurality of objects is stored.

2. The method of claim 1, wherein said plurality of objects comprises a link object and a virtual communication relationship (VCR) object, wherein said link object provides a link between said VCR object and a location storing an application data exchanged between said first device and said second device, and said VCR object provides a link to another VCR object in said first device.

3. The method of claim 2, wherein said second device comprises a publisher and said first device comprises a subscriber, said first device and said second device being contained in a control system, said second device containing a second function block to generate said application data and said first device containing a first function block to receive said application data, and wherein said index specifies a memory location where said second function block is located.

4. The method of claim 3, wherein said second field comprises a local index field in said link object, said reestablishing comprises modifying said local index field in said link object according to said index.

5. The method of claim 4, wherein said third device comprises a supervisory control station, said method further comprising maintaining a copy of said link object in said supervisory control station, wherein said modifying comprises changing said local index field in said copy and downloading said copy to said second device.

6. The method of claim 5, further comprises maintaining in said supervisory control station a catalogue of connections from/to each of said function blocks, wherein said copy is identified according to said catalogue.

7. The method of claim 6 wherein said first field comprises a remote index field in a link object contained in said first device.

8. The method of claim 2, wherein said second device comprises a subscriber and said first device comprises a publisher, said first device and said second device being contained in a control system, said second device containing a second function block to receive said application data, and wherein said index specifies a memory location where said second function block is located after said second device is reinitialized.

9. The method of claim 2, wherein said device comprises a replaced unit.

10. A computer readable medium carrying one or more sequences of instructions for causing a control station to provide a connection between a first device and a second device contained in a process automation system, a first field in said first device and a second field in said second device being required to have a same value for communication on said connection between said first device and said second device, said process automation system also containing a host controller designed to control operation of said first device and said second device, wherein each of said first device and said second device is implemented as a separate unit from said host controller, wherein execution of said one or more sequences of instructions by one or more processors contained in said control station causes said one or more processors to perform the actions of:

storing data identifying said first field in said first device and said second field in said device; receiving data indicating that said second field has changed to a new value when said second device is reinitialized; examining said data to determine that the value in at least one of said first field and said second field is to be changed for communication to continue on said connection between said first device and said second device after said initialization; and reestablishing said connection by changing the value in at least one of said first field and said second field to ensure the values in said first field and said second field are equal, wherein said second device contains a plurality of objects providing said connection, wherein said new value comprises an index indicating a memory location where one of said plurality of objects is stored.

11. The computer readable medium of claim 10, wherein said plurality of objects comprises a link object and a virtual communication relationship (VCR) object, wherein said link object provides a link between said VCR object and a location storing an application data exchanged between said first device and said second device, and said VCR object provides a link to another VCR object in said first device.

12. The computer readable medium of claim 11, wherein said second device comprises a publisher and said first device comprises a subscriber, said first device and said second device being contained in a control system, said second device containing a second function block to generate said application data and said first device containing a first function block to receive said application data, and wherein said index specifies a memory location where said second function block is located.

13. The computer readable medium of claim 12, wherein said second field comprises a local index field in said link object, said reestablishing comprises modifying said local index field in said link object according to said index.

14. The computer readable medium of claim 13, further comprising maintaining a copy of said link object in said control station, wherein said modifying comprises changing said local index field in said copy and downloading said copy to said second device.

15. The computer readable medium of claim 14, further comprises maintaining in said control station a catalogue of connections from/to each of said function blocks, wherein said copy is identified according to said catalogue.

16. The computer readable medium of claim 15 wherein said first field comprises a remote index field in a link object contained in said first device.

17. The computer readable medium of claim 11 wherein said second device comprises a subscriber and said first device comprises a publisher, said first device and said second device being contained in a control system, said second device containing a second function block to receive said application data, and wherein said index specifies a memory location where said second function block is located after said second device is reinitialized.

18. The computer readable medium of claim 11 wherein said device comprises a replaced unit.

19. A system facilitating a connection to be provided between a first device and a second device, said first device and said second device being contained in a process automation system, said process automation system also containing a host controller designed to control operation of said first device and said second device, wherein each of said first device and said second device is implemented as a separate unit from said host controller, said system comprising:

means for establishing said connection between said first device and said second device, a first field in said first device and a second field in said second device being required to have a same value for communication on said connection between said first device and said second device;

means for storing data identifying said first field in said first device and said second field in said device;

means for receiving data indicating that said second field has changed to a new value when said second device is reinitialized;

means for examining said data in said third device to determine that the value in at least one of said first field and said second field is to be changed for communication to continue on said connection between said first device and said second device after said initialization; and means for reestablishing said connection between said first device and said second device after said reinitialization by changing the value in at least one of said first field and said second field to ensure the values in said first field and said second field are equal, wherein said second device contains a plurality of objects providing said connection, wherein said new value-comprises an index indicating a memory location where one of said plurality of objects is stored.

20. The system of claim 19, wherein said plurality of objects comprises a link object and a virtual communication relationship (VCR) object, wherein said link object provides a link between said VCR object and a location storing an application data exchanged between said first device and said second device, and said VCR object provides a link to another VCR object in said first device.

21. The system of claim 20, wherein said second device comprises a publisher and said first device comprises a subscriber, said first device and said second device being contained in a control system, said second device containing a second function block to generate said application data and said first device containing a first function block to receive said application data, and wherein said index specifies a memory location where said second function block is located.

22. The system of claim 21, wherein said second field comprises a local index field in said link object, said reestablishing comprises modifying said local index field in said link object according to said index.

23. The system of claim 22, said system further comprising maintaining a copy of said link object in said supervisory control station, wherein said modifying comprises changing said local index field in said copy and downloading said copy to said second device.

24. The system of claim 23, further comprises maintaining in said supervisory control station a catalogue of connections from/to each of said function blocks, wherein said copy is identified according to said catalogue.

25. The system of claim 24, wherein said first field comprises a remote index field in a link object contained in said first device.

26. The system of claim 20, wherein said second device comprises a subscriber and said first device comprises a publisher, said first device and said second device being contained in a control system, said second device containing a second function block to receive said application data, and wherein said index specifies a memory location where said second function block is located after said second device is reinitialized.

27. The system of claim 20, wherein said device comprises a replaced unit.

* * * * *